United States Patent Office 3,280,473
Patented Oct. 25, 1966

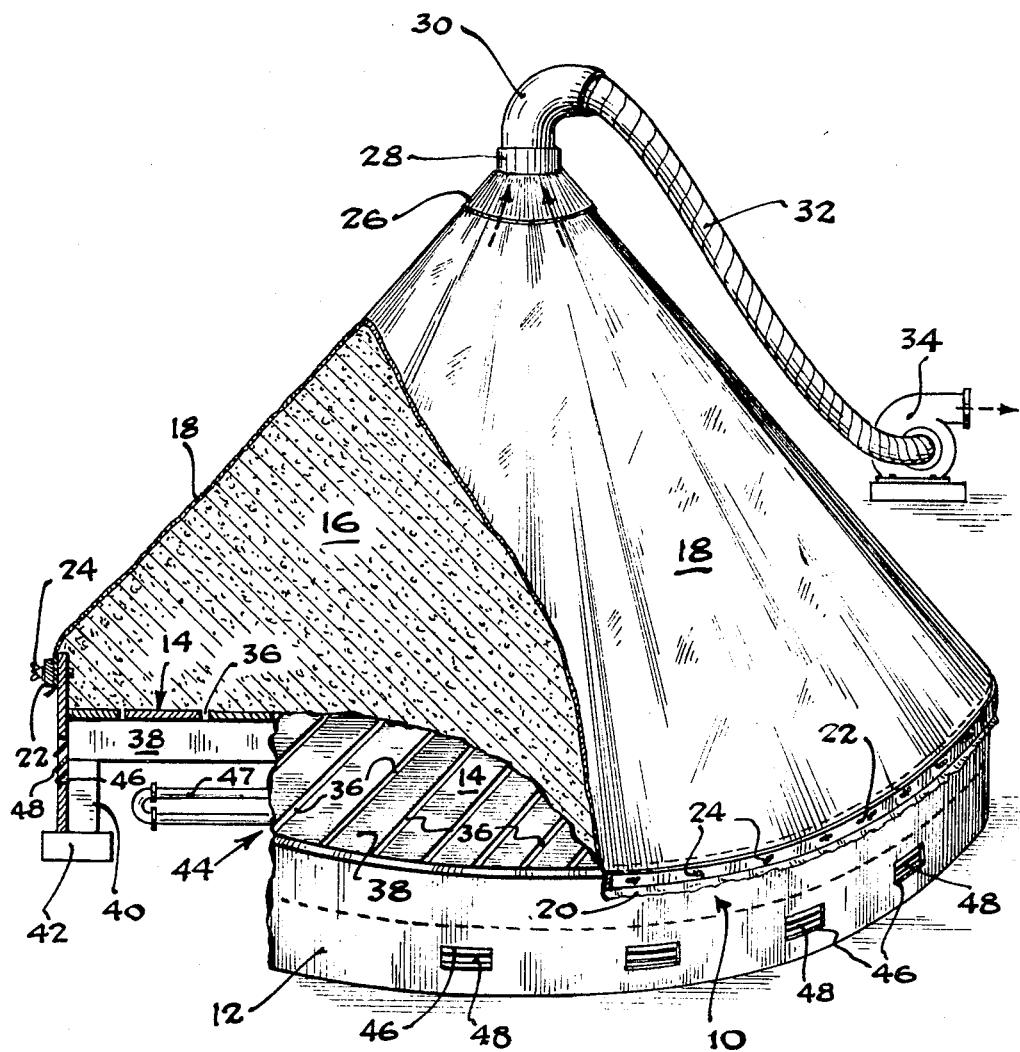
Inventor
Alan L. Sullivan
By John G. Premo
Attorney

3,280,473
CEREAL DRYER
Alan L. Sullivan, 1725 Chestnut, Waukegan, Ill.
Filed June 3, 1965, Ser. No. 460,931
7 Claims. (Cl. 34—15)

This invention relates to a dryer for cereals which is efficient, inexpensive to construct and is capable of drying all the well known cereal grains.

The cereals are members of the grass family, Graminae, which are grown to provide grain for feeding humans and animals. Certain of these grains provide useful non-food products such as chemicals. For purposes of this invention such cereals as wheat, rye, barley, corn, oats, rice, buckwheat and sorghum are intended as being included in the generic expression, "cereals and/or grain" which are used interchangeably.

One of the chief advantages possessed by cereals is their excellent keeping quality. However, the preservation of large quantities of grain for prolonged periods of time requires that their moisture content be reduced below about 14–15%. When stored for long periods of time at moisture contents in excess of those specified such problems as heating, loss of viability, loss of nutritine quality, molding and rotting often develop. Many of these problems are related to respiration of the grain. The respiration of cereals is negligible when stored at a moisture content at 14–15% or less. The respiration rate may also be controlled by means of chemicals or by means of vacuum storage which reduces available oxygen which is necessary for the respiration process. These methods though effective are too costly for their use to achieve widespread acceptance.

It is still the practice of the industry to attempt to control the moisture content of the cereal grains by harvesting and storing them during dry weather. When stored in terminal elevators with too high a moisture content it is customary to force heated air through thin columns of the grain. In more elaborate installations complex drying and cooling sections have been devised to reduce the moisture content of the grains. While these measures are effective, such elevators are extremely costly and are not always available at many locations where grains are harvested, transported or stored.

It would be a valuable contribution to the art if an inexpensive cereal dryer were available which could be constructed economically, efficiently dry grain and at the same time be capable of use in conjunction with portable grain handling equipment such as conveyors. It, therefore, becomes an object of the invention to provide an inexpensive cereal dryer.

Another object of the invention is to furnish a cereal dryer that is easily constructed at most locations and can be used with portable grain conveying equipment. Other objects will appear hereinafter.

In its broadest and simplest aspect the invention relates to drying cereals in a device consisting of a shallow tray to which is affixed a large air and moisture impervious flexible cover which not only covers the grain which is mounted high over the top of the tray but which contains the grain by means of a negative pressure within the flexible cover. For a typical adaptation of the invention reference may be had to the drawing which is a vertical plan view, cut away in part showing a preferred cereal dryer of the invention.

With particular reference to the drawing the cereal dryer is composed of a shallow tray 10 which is of large horizontal dimension. It is constructed in the form of a large diameter cylindrical wall 12 the interior of which is divided into two horizontal sections by means of a horizontally disposed perforate deck 14. The upper portion of the tray may be considered as a pan for supporting a large volume of grain 16. It should be noted that the grain is of a volume in excess of the volume of the pan.

Covering the grain supported by the pan is an air and water impervious flexible cover 18. The bottom 20 of the cover is circular and engages the top of the tray in a sealing relationship. To insure a relatively air tight fit the cover bottom is secured to the top of the cylinder by means of sealing ring 22 which is mounted on the top of the tray by a number of suitable fasteners, such as wing nut and bolt 24.

The flexible cover 18 may be fabricated from a variety of materials such as rubberized fabrics, plastics, rubber sheeting and the like although for ease of handling and economics of fabrication synthetic plastics are preferred. For example polymers and copolymers of ethylene, propylene, acrylonitrile, vinyl chloride, vinylidene chloride are well suited as materials of construction for fabricating the flexible cover, similarly, plastic reinforced fiber glass, polyesters polyamides and polyurethanes may also be employed. Of these synthetic coverings polyethylene is preferred due to cost and availability considerations.

The flexible cover 18 is frustoconical in shape with its apex being attached to a collar 26 the neck 28 of which is fitted with a duct connector 30. This connector has fitted thereto a flexible duct 32. The end of the duct is attached to an exhaust fan 34 which may be fitted with a variable speed control (not shown) for regulating the amount of air being conducted through the grain 16.

The exhaust fan 34 moves air through the grain 16 uniformly by pulling the air through a series of parallel spaced apart slots 36 which cover the area of the deck 14. The deck is held in place by a series of spaced apart horizontal deck supports 38 which are in turn supported by vertical posts 40 which rest upon footings 42.

The space below the perforate deck 14 form a plenum chamber 44 which contains a heat exchanger 47 which can be used to either heat or dehumidify air entering the plenum chamber through vents 46 located around the periphery of the cylindrical wall 12. For purposes of regulating the volume of air entering the vents adjustable louvers 48 are fitted to the vents.

In operation a grain such as shelled corn is placed on the perforate deck 14 by means of conventional conveying equipment. It is mounded to form a general cone shaped configuration. To aid in forming this cone shape the deck 14 may be slightly dished to more evenly distribute the air through the grain although this is not shown to the best advantage in the drawing.

After the grain is mounded the flexible cover is placed over the grain and fastened to the tray 10 by the sealing ring 22. The flexible duct 32 is connected to the flexible cover and the exhaust fan 34 then placed in operation. By either adjusting the speed of the exhaust fan and/or the louvers 48 it is possible to create a negative pressure within the flexible cover thereby causing it to conform itself to the contours of the stored grain 16. If the outside air is warm and dry then the device will dry the grain to a suitable moisture content for storage. If the air is cool then it may be heated by heat exchanger 47 which may also serve to dehumidify the air if its moisture content is excessive.

While the cereal dryer shown is designed to dry grain it is to be understood that it also may be used to store the grain once it has been dried. In some cases dry grain may be placed in the device and stored therein. In these cases the louvers are closed and the exhaust fan operated to maintain a negative pressure.

The total static pressure of the system consists of the pressure drop across the cereal to be dried and the pressure drop across the louvers and the pressure losses in the system. The pressure holding the flexible cover in place will vary from that created by losses in the plenum (all louvers open) to the maximum negative pressure the exhaust fan can develop (all louvers closed).

The device thus illustrated may be constructed on most farm lands, near conventional elevators and near points of transportation. Its cost in relation to the volume of grain acted upon is well below the cost of conventional grain dryers. It can be repaired easily and may be dismounted for reconstruction at other sites.

Having thus described my invention, I claim:

1. A cereal dryer comprising a shallow tray of large horizontal dimension and vertical sides adapted to contain a large volume of cereal, an air and moisture impervious flexible cover adapted to fit in sealing relationship with the vertical sides of the tray, said cover being of sufficient size to cover a quantity of cereal whose volume is greater than the volume of the tray, inlet means for uniformly introducing incoming air into the tray and flexible cover, means for removing air from the tray and the flexible cover and means for adjusting the relationship between the incoming and removed air whereby a condition of negative pressure is maintained within the flexible cover thereby causing it to substantially mold itself to the contours of cereal contained therewithin.

2. A cereal dryer comprising a shallow tray of large horizontal dimension and short vertical sides adapted to contain a large volume of cereal, said tray comprising a vertically disposed cylinder which is horizontally divided by a perforate deck to provide a top cereal supporting pan and a bottom plenum chamber, a plurality of air inlet means located around the periphery of the plenum chamber to deliver incoming air uniformly through the perforate deck, a substantially conical air and moisture impervious flexible cover adapted to fit in sealing relationship with the top of the pan, said cover being of sufficent size to cover a quantity of cereal whose volume is greater than the volume of the tray, air removing means associated with the flexible cover for removing air from the tray and the flexible cover and means for adjusting the relationship between the incoming and removed air whereby a condition of negative pressure is maintained within the flexible cover thereby causing it to substantially mold itself to the contours of the cereal contained therewithin.

3. The cereal dryer of claim 2 where the means for adjusting the relationship between the incoming and removed air are adjustable louvers for the air inlet means.

4. The cereal dryer of claim 2 where the means for adjusting the relationship between the incoming and removed air is a variable speed air exhaust device.

5. The cereal dryer of claim 2 where the perforate deck is dished and the perforations are in parallel spaced apart relationship and cover substantially the entire surface of the deck.

6. The cereal dryer of claim 2 where the plenum chamber has air heating means associated therewithin.

7. A cereal dryer comprising a shallow tray of large horizontal dimension and short vertical sides adapted to contain a large volume of cereal, said tray comprising a vertically disposed cylinder which is horizontally divided by a perforate deck to provide a top cereal supporting pan and a bottom plenum chamber, said perforate deck having its top of dished shape and its perforations being in spaced apart parallel relationship and covering substantially the entire surface of the deck, horizontally running supports for holding the perforate deck between the plenum chamber and the cereal supporting pan, a plurality of adjustably louvered air inlets located around the periphery of the plenum chamber to deliver air uniformly through the perforate deck, heating means within the plenum chamber for heating the air delivered to the perforate deck, a frusto-conical air and moisture impervious flexible plastic cover whose base is adapted to fit in sealing relationship with the top of the pan, sealing means horizontally disposed near the top of the tray for the engagement with the base of the flexible cover, said flexible cover being of sufficient size to cover a quantity of cereal whose volume is greater than the volume of the tray, a collar located at the apex of the flexible cover, a flexible air removing conduit having one end attached to said collar and the other end to an air exhausting blower with the volume of air capable of being removed by the blower being sufficient to establish a condition of negative pressure within the flexible cover thereby causing it to substantially mold itself to the contours of the cereal contained therewithin.

References Cited by the Examiner
UNITED STATES PATENTS 2,895,400  7/1959  Topf _____ 98—55
2,929,154  3/1960  Finnegan _____ 98—56

WILLIAM J. WYE, *Primary Examiner.*